United States Patent [19]
Bath et al.

[11] Patent Number: 6,022,421
[45] Date of Patent: Feb. 8, 2000

[54] METHOD FOR REMOTELY LAUNCHING SUBSEA PIGS IN RESPONSE TO WELLHEAD PRESSURE CHANGE

[75] Inventors: William R. Bath, Cypress; Charles R. Yemington, Houston, both of Tex.

[73] Assignee: Sonsub International, Inc,, Houston, Tex.

[21] Appl. No.: 09/033,966

[22] Filed: Mar. 3, 1998

[51] Int. Cl.[7] .............................. B08B 9/04; F16L 45/00; F16L 55/00
[52] U.S. Cl. ............................ 134/8; 134/18; 134/22.11; 15/3.5; 15/104.05; 15/104.062
[58] Field of Search ............................ 134/8, 18, 22.11, 134/22.12, 22.18; 15/104.03, 104.05, 104.062, 104.063

[56] References Cited

U.S. PATENT DOCUMENTS

| | | | |
|---|---|---|---|
| 3,600,736 | 8/1971 | Smith et al. | 15/104.06 R |
| 5,139,576 | 8/1992 | Davis | 134/8 |
| 5,219,244 | 6/1993 | Skeels | 405/158 |
| 5,444,886 | 8/1995 | Takashina et al. | 15/3.51 |
| 5,795,402 | 8/1998 | Hargett, Sr. et al. | 134/8 |
| 5,842,816 | 12/1998 | Cunningham | 405/170 |

*Primary Examiner*—Zeinab El-Arini
*Attorney, Agent, or Firm*—Akin, Gump, Strauss, Hauer & Feld, L.L.P.

[57] ABSTRACT

A method for sensing and launching pipeline pigs into a pipeline. The method includes pressurizing a pressure accumulator in a pig launching system that includes a pig chamber, a plurality of pigs, a launch tube, and the pressure accumulator. The method further includes sensing a pressure within the pipeline and applying pressure from the pressure accumulator to force a pig through the launch tube and into the pipeline.

16 Claims, 13 Drawing Sheets

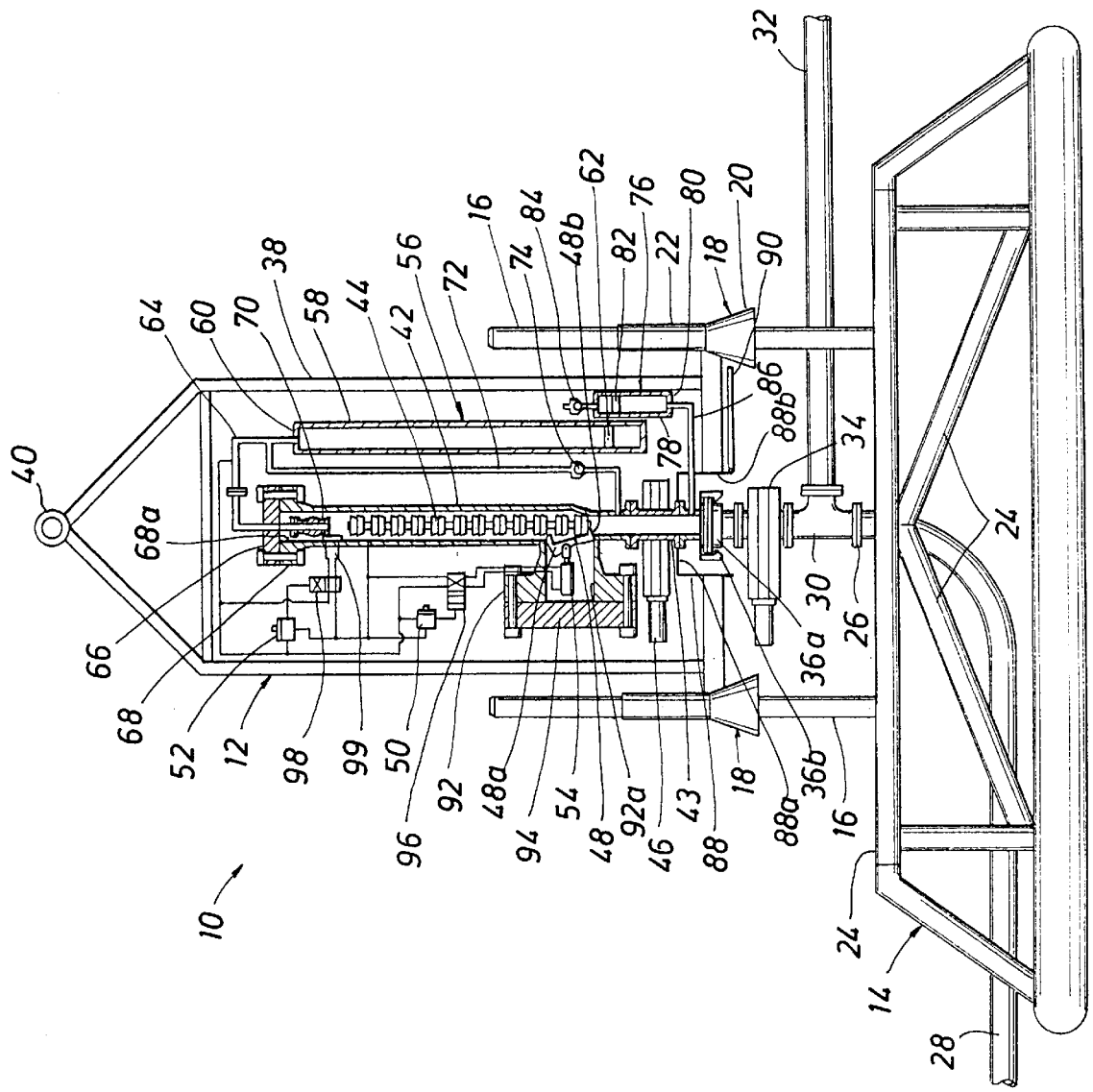

METHOD FOR REMOTELY LAUNCHING SUBSEA PIGS IN RESPONSE TO WELLHEAD PRESSURE CHANGE

SPECIFICATION

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to pigging operations for cleaning pipelines, and more particularly relates to a pig storage and launching apparatus and method for pigging subsea pipelines.

2. Description of the Related Art

The production of paraffin, hydrates, and other detrimental materials from new oil and gas wells can not be accurately predicted before production begins. Subsea satellite oil wells are particularly susceptible to paraffin and hydrate blockage of the production pipeline because of the long pipeline lengths to a production manifold or platform and due to the cold temperatures on the sea floor. Oil producers are often faced with the need to clean pipelines that were expected to produce only clean, dry gas. Cleaning the pipelines with a pipeline pig is often the only available method to prevent paraffin buildup and subsequent blockage.

A common method of pigging a pipeline involves the use of a second pipeline, called a pigging loop, to send a pig to the end of the pipeline near the producing well. In many cases, no pigging loop exists because pigging needs were not envisioned when the well was completed.

The producing well is commonly connected to a single pipeline by a short pipe or hose, commonly called a "jumper," that has a connector on each end. Jumpers can be in various configurations. A common type of connecting jumper is called the "inverted U-jumper." The inverted U-jumper method of connecting a subsea well to a pipeline incorporates an upward facing male connector hub at a subsea tree and at the end of the pipeline. A U-jumper having a downward facing female connector hub at each end of a short pipe length is connected to the upward facing male connector hubs.

As subsea wells have moved into deeper and deeper waters, the costs associated with pigging a subsea pipeline have become an even greater issue to the oil producers. It is desirable to have a subsea pig launcher assembly that is simple to install and use, reliable, and cost effective. It is desirable that the subsea pig launcher assembly be capable of storing and launching a plurality of pigs over a period of time without retrieval to the surface. It is also desirable that the subsea pig launcher assembly maintains integrity of the pipeline fluid containment pressure boundary.

SUMMARY OF THE INVENTION

The present invention is a subsea pig launcher assembly with remotely operated injector for multiple pigs and a method for pigging deepwater subsea pipelines. The subsea pig launcher assembly of the present invention is an automatic, diverless pig storage and launching system for deepwater subsea pipelines that eliminates the need of a pigging loop. The subsea pig launcher assembly includes a pipeline base and a pig launcher. The pig launcher is mounted directly on the pipeline at the pipeline base near the subsea wellhead. The pig launcher contains a plurality of pigs that can be released individually in response to a predetermined pressure drop in the pipeline. After the pig is launched, wellhead pressure drives the pig to a host production platform. The subsea pig launcher assembly works equally well on natural gas, crude oil, or multiphase flow pipelines.

The pig launcher apparatus includes a pig chamber having a plurality of pigs stored in the pig chamber. A pig gate is connected to the pig chamber and launch tube is connected to an end of the pig chamber. A pressure accumulator is connected with piping to the pig chamber. A valve allows isolation or communication between the pressure accumulator and the pig chamber. The pig gate has a ready position and a launch position. In the ready position the pig gate prevents a pig from entering the launch tube and in the launch position the pig gate allows one pig to enter the launch tube. The pig launcher apparatus also includes a pressure sensing circuit which senses the pressure in the pipeline. The pressure sensing circuit controls the position of the pig gate and the valve which allows pressure from the pressure accumulator to force the pig through the launch tube and into the pipeline.

The subsea pig launcher is deployed by a surface vessel of opportunity. An ROV guides the pig launcher to dock with the pipeline base fitted with an upward facing pipe tee, a piggable shut-off valve, and a male collet connector. The ROV energizes a female collet connector on the pig launcher and then tests the connection for leakage. After testing, the ROV opens the shut-off valve on the pipeline base to pressurize the pig launcher to pipeline pressure. The subsea pig launcher is now ready for use.

Preselected sequence valves control the pig launch mechanism. The operating pressure of the sequence valves is selected to match the pressure characteristics of the pipeline. The pipeline operator is able to launch a pig by reducing the product flow at the wellhead so that the pipeline pressure is lowered to the setpoint of the sequence valves. When the sequence valves sense the setpoint pressure, a single pig is launched into the pipeline. Restoring the flow from the wellhead raises the pipeline pressure and drives the pig toward the host production platform.

When all the pigs in the pig launcher have been deployed, a surface vessel and ROV of opportunity can retrieve the pig launcher. To recover the pig launcher, the ROV closes the pipeline shut-off valve and the launcher isolation valve on either side of the collet connector. The ROV releases the collet connector and the surface vessel lifts the pig launcher off the pipeline base. The ROV closes a trap door on an underwater drip pan to isolate the pipeline product trapped between the shut-off and isolation valves. The pig launcher is recovered to the vessel deck with pipeline product at near seawater bottom pressure. The pipeline product can then be safely transferred to a suitable disposal location. The subsea pig launcher can be refilled with pigs and recharged but depending on the length of time on the sea floor it may be more advantageous to install a second pig launcher on the pipeline base and save the surface vessel day rate.

BRIEF DESCRIPTION OF THE DRAWINGS

In order to more fully understand the drawings referred to in the detailed description of the present invention, a brief description of each drawing is presented, in which:

FIG. 1 is a sectional elevational view of the subsea pig launcher assembly connected to a subsea pipeline;

DETAILED DESCRIPTION OF INVENTION

Figure 2A:
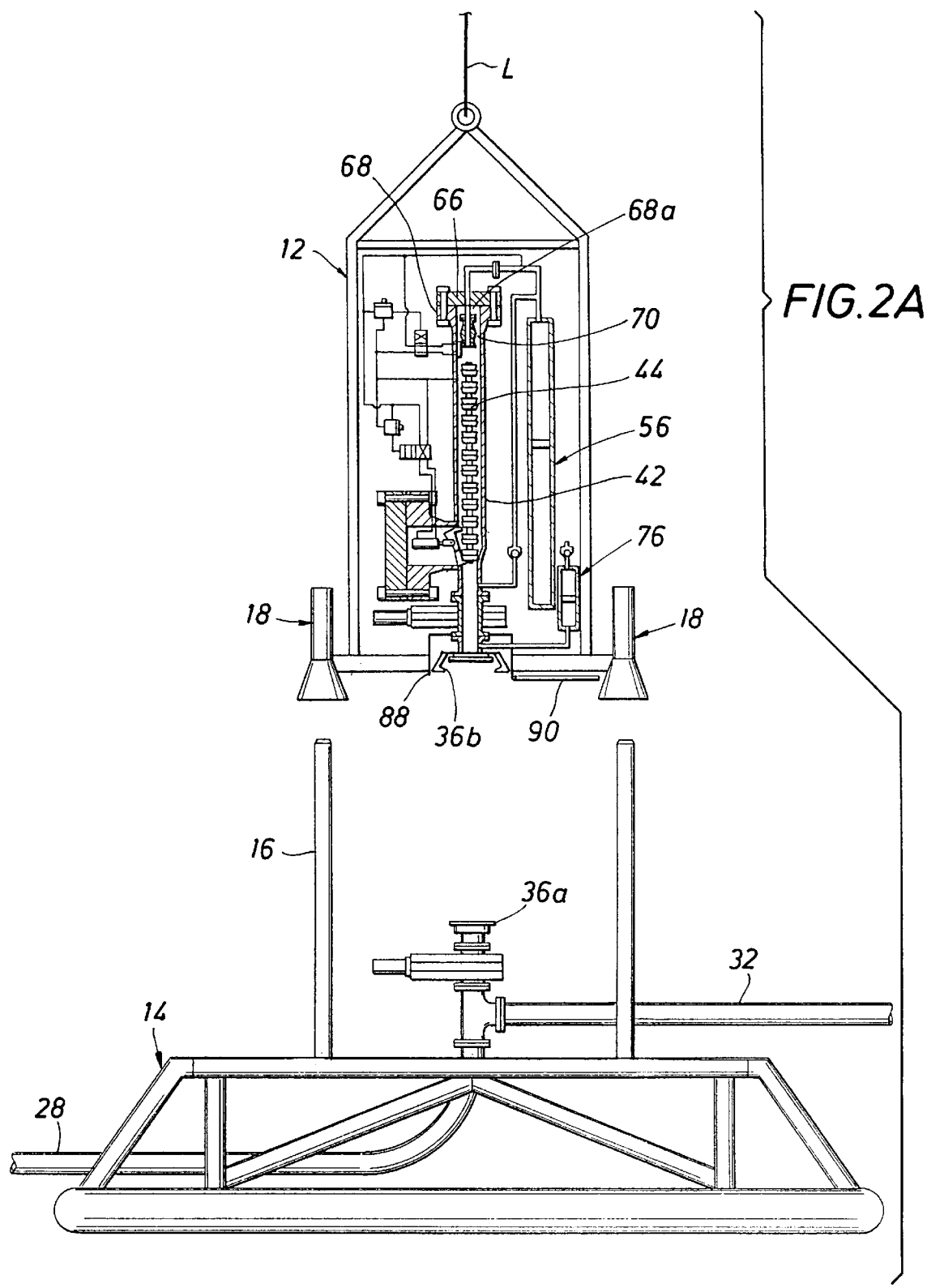
FIGS. 2A–2D are sectional elevational views showing the installation sequence of the subsea pig launcher assembly to the pipeline.

A detailed description of the subsea pig launcher assembly, generally designated as reference 10, will now be discussed with specific reference to the drawings. Referring to FIG. 1, the subsea pig launcher assembly 10 includes a pig launcher 12 which is lowered onto a pipeline base 14. Preferably, the pipeline base 14 has a plurality of upwardly extending guide posts 16 and the pig launcher 12 includes a corresponding number of stabbing guides 18 comprising downwardly facing guide post funnels 20 connected to sleeves 22. It is to be understood that other types of alignment aids can be used in place of the guideposts 16 and stabbing guides 18.

Preferably, the pipeline base 14 is a sled-like structure having bracing 24 adapted to position an upwardly facing hub or flange 26 connected to an end of a pipeline 28. The flange 26 is positioned relative to the guideposts 16 for the mating of the pig launcher 12 with pipeline 28 as will be explained below. Preferably, a vertical pipe tee 30 is connected to the flange 26 as shown in FIG. 1. A horizontal pipeline section 32 is connected to the pipe tee 30 at a first end and is typically connected to a subsea wellhead at a second end.

Still referring to FIG. 1, an isolation or shut-off valve 34 is connected to the pipe tee 30 at a location to allow fluid flow through the pipeline 28 and pipeline section 32 even when the pig launcher 12 is not connected to the pipeline base 14. Preferably, the shut-off valve 34 is operable by a remotely operated vehicle (ROV). A mechanical connector portion 36a is positioned above the shut-off valve 34 for connecting with a mating connector portion 36b of the pig launcher 12. Preferably, the mechanical connector 36 (FIG. 2B) is a collet connector.

The pig launcher 12 includes an outer framework 38 to which the stabbing guides 18 are attached. The framework 38 includes a lift line attachment device 40, shown as a ring or eye, for vertically raising and lowering the pig launcher 12 as will be explained below.

Still referring to FIG. 1, the pig launcher 12 includes an upper pig chamber 42, preferably vertically oriented, for storing a plurality of pigs 44 connected to a launch tube 43 having a reduced diameter. As shown in FIG. 1, the upper pig chamber 42 has an inner diameter greater than the outer diameter of the pigs 44 whereas the launch tube 43 has an inner diameter approximating the outer diameter of the pigs 44 for reasons which will be explained below. An isolation valve 46 is connected to the launch tube 43 and the mating connector portion 36b of the mechanical connector 36 is located below the isolation valve 46.

A pig gate 48 is operably positioned in the lower end of the upper pig chamber 42 and above the launch tube 43. The pig gate 48 is operable between a launch position (FIG. 3A) and a ready position (FIG. 1). The pig gate 48 includes an upper fork 48a and a lower fork 48b spaced approximately one pig length apart for reasons which will be explained below. It is to be understood that the pig chamber 42 transitions in inner diameter at or slightly above the lower fork 48b. A hydraulic cylinder 54 is connected to the pig gate 48 and shifts the pig gate 48 between the launch and ready positions. Preferably, the hydraulic cylinder 54 and the pig gate 48 are mounted within the bore 92a of a hub 92. A closure member 94, as for example a blind flange, is mounted to the hub 92 to provide access to the hydraulic cylinder 54 and the pig gate 48.

Still referring to FIG. 1, a pressure accumulator 56 comprises a cylindrical tank 58 having an opening 60 at one end and an internal piston 62 which is a floating piston. Although not shown, the pressure accumulator 56 includes a charging inlet for providing a charge in the pressure accumulator 56, preferably with nitrogen gas, on the side of the piston 62 opposite the opening 60. A first pipe spool 64 is connected to the opening 60 and extends through a closure member 66. The closure member 66 is connected to an upper chamber flange 68 having a bore 68a therethrough. The upper chamber flange 68 is connected to the upper end of the pig chamber 42. A valve 70, preferably a ball valve, is connected to the first pipe spool 64. Preferably, the valve 70 is located on the end portion of the first pipe spool 64 extending through the closure member 66 as shown in FIG. 1. It is to be understood that the valve 70 can be any type of two-way valve that can be operated by a remote control valve.

A second pipe spool 72 provides fluid communication between the launch tube 43 and the first pipe spool 64. The second pipe spool 72 is connected to the launch tube 43 above the isolation valve 46. A check valve 74 is installed in the second pipe spool 72 such that fluid flow is only permitted in the second pipe spool 72 in the direction from the launch tube 43 to the first pipe spool 64. It is to be understood that the second pipe spool 72 is in fluid communication with the pressure accumulator 56.

Still referring to FIG. 1, the pig launcher 12 includes a purge accumulator 76 comprising a cylindrical tank 78 having an opening 80 at one end and an internal piston 82 which is a floating piston. The purge accumulator 76 includes a charging inlet 84 for providing a charge in the purge accumulator 76, preferably with nitrogen gas, on the side of the internal piston 82 opposite the opening 80. A third pipe spool 86 is connected to the opening 80 and to the launch tube 43. The third pipe spool 86 provides fluid communication between the launch tube 43 and the purge accumulator 76.

Referring to FIG. 1, the pig launcher 12 includes an inverted drip pan 88 having a bottom door 90 hingedly connected to the inverted drip pan 88. Preferably, the inverted drip pan 88 includes a top panel 88a which is sealed around the launch tube 43 at a location above the mechanical connector 36. A plurality of sidewalls 88b are connected to the top panel 88a and extend down below the mechanical connector 36 for reasons which will be explained below. The bottom door 90 is capable of sealingly engaging the plurality of sidewalls 88b to form a sealed enclosure within the inverted drip pan 88.

Still referring to FIG. 1, preselected first and second sequence valves 50 and 52, respectively, preferably control the launching operation of the pig launcher 12 through the pipeline pressure sensed in the first pipe spool 64. The sequence valves 50, 52 are preferably pressure relief valves. The operating pressure of each sequence valve 50 and 52 is selected to match the pressure characteristics of the pipeline 28. Preferably, the first sequence valve 50 has a higher pressure setting than the second sequence valve 52. Upon sensing its preset pressure setting, the first sequence valve 50 sends a signal to a control valve 96, preferably a four-way valve, that operates the hydraulic cylinder 54 controlling the position of the pig gate 48. In other words, the first sequence valve 50 acts as a trigger and signals the control valve 96 to open and close the ports on the hydraulic cylinder 54 making the cylinder rod move in and out. As the cylinder rod moves out the upper fork 48a is pivoted forward as the lower fork 48b pivots backward allowing the lowermost pig 44' to be pushed or forced down into the reduced diameter launch tube 43 for reasons which will be explained below.

The second sequence valve 52, upon sensing its lower preset pressure setting, sends a signal to a second control valve 98, preferably a four-way valve, that operates a hydraulically operated valve operator 99, such as a hydraulic cylinder. The valve operator 99 opens the valve 70 connected to the first pipe spool 64. The second control valve 98 will allow the valve 70 to close after the pressure drops off as will be explained below.

The installation sequence of the pig launcher 12 on the pipeline base 14 will now be explained in detail with specific reference to FIGS. 2A–2D. Prior to lowering the pig launcher 12, a plurality of pigs 44 are installed in the pig chamber 42 through the bore 68a of the upper chamber flange 68 after removing the closure member 66 with the suspended valve 70. The accumulators 56 and 76 are charged with pressurized gas. The functional parameters of the pig launcher 12 are preferably tested prior to lowering to the sea floor.

Figure 2B:
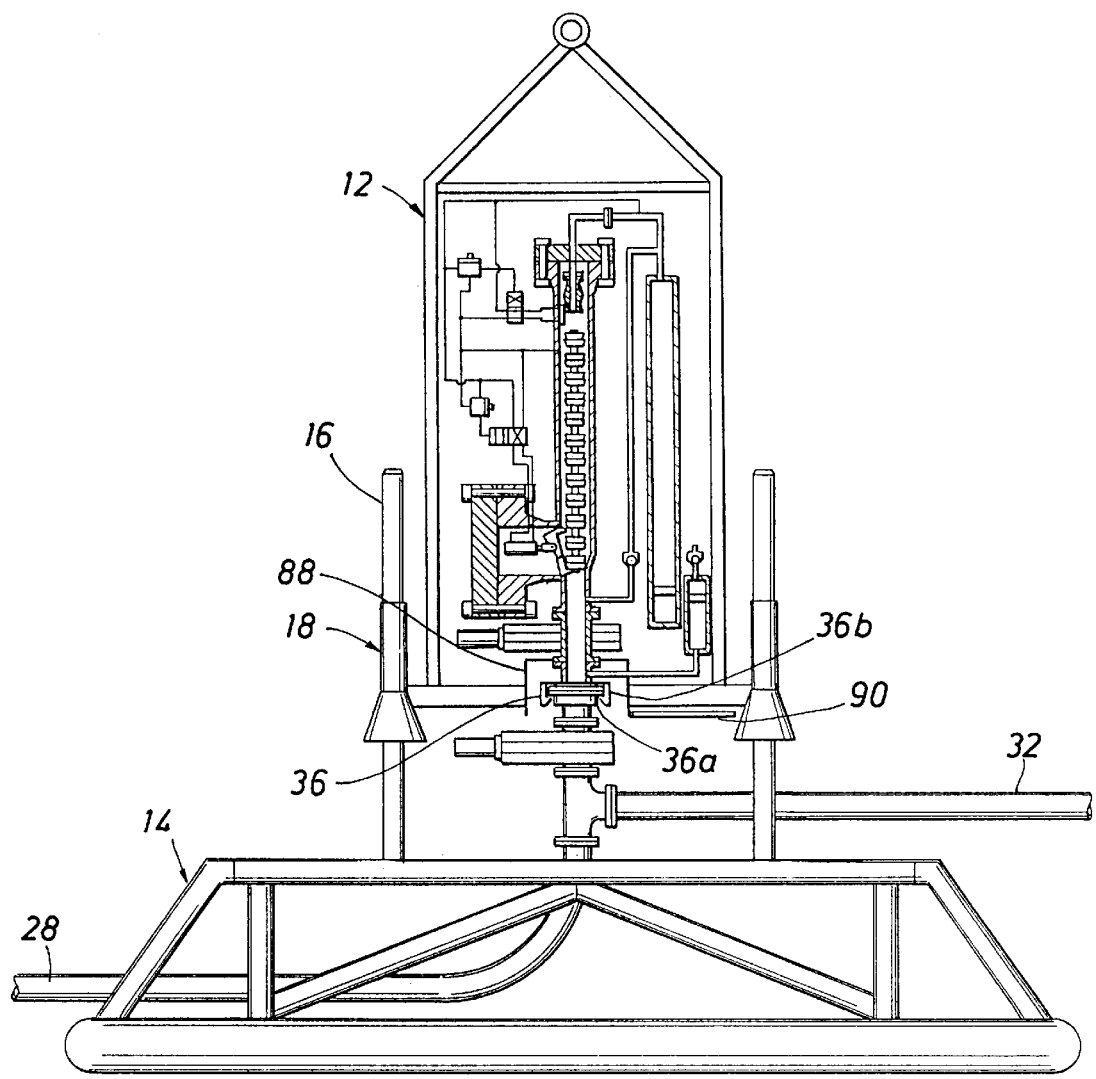
Figure 2C:
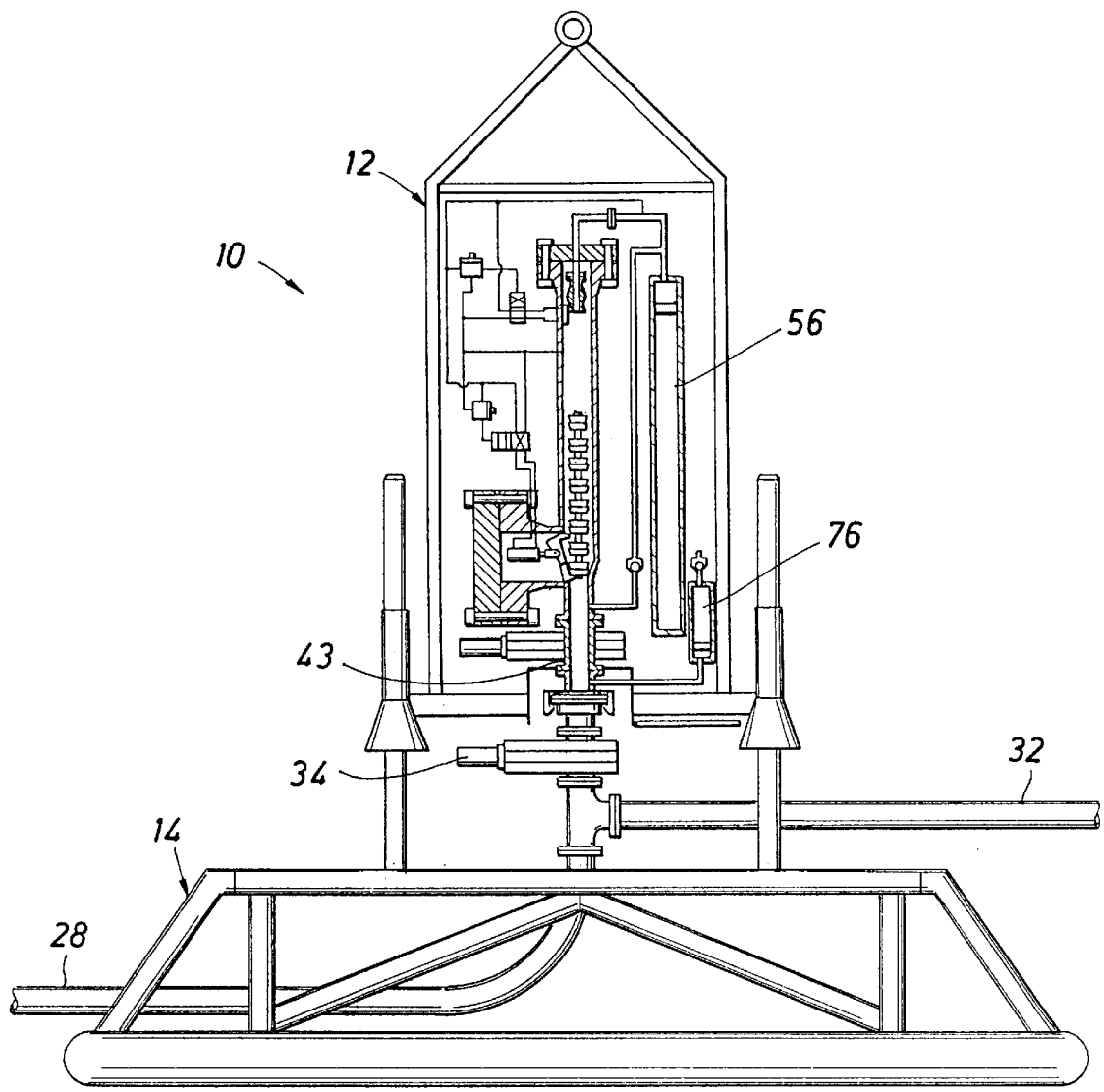
Figure 2D:
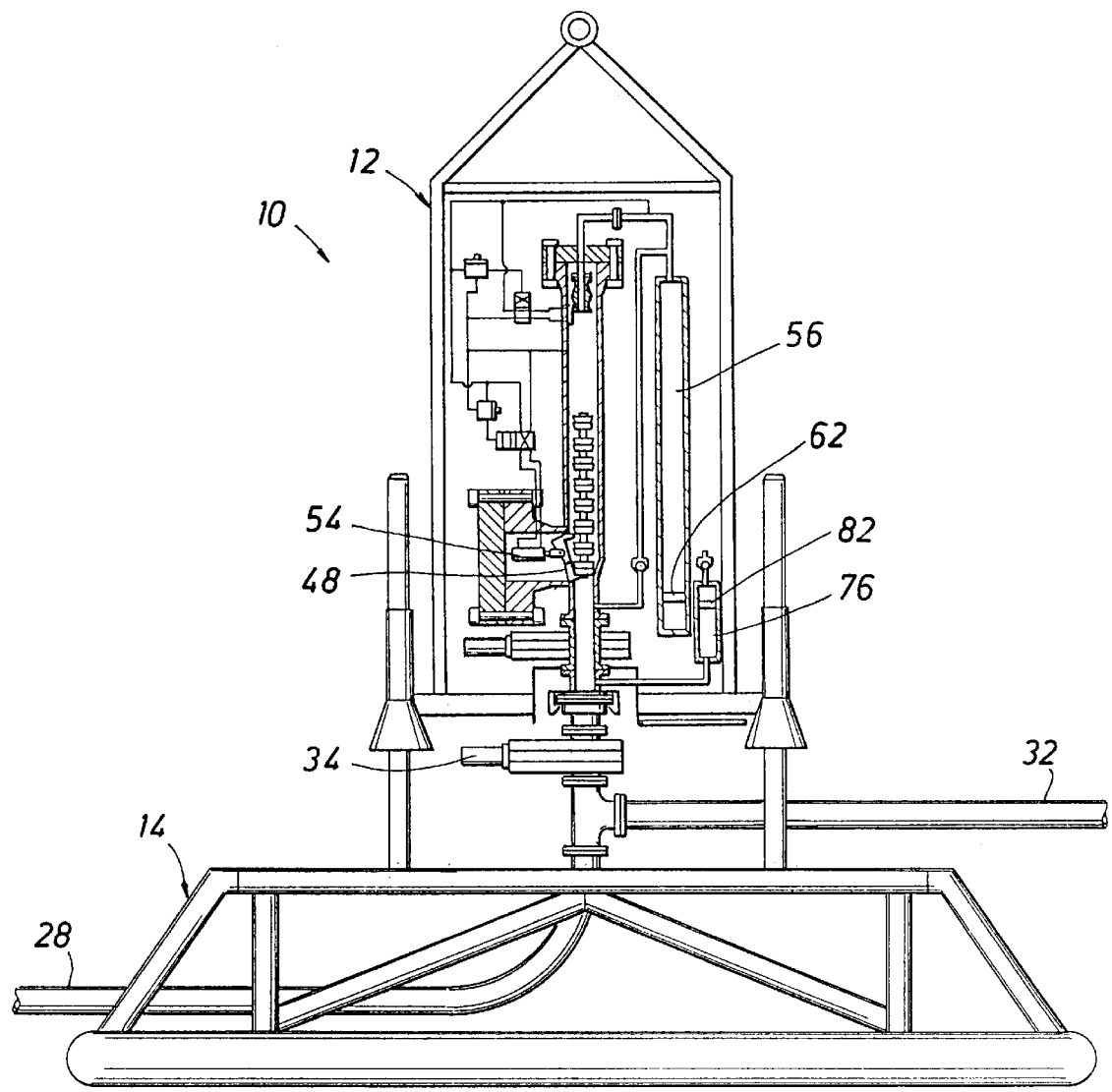

As shown in FIG. 2A, the pig launcher 12 is lowered to the pipeline base 14 by a lift line L from the floating vessel (not shown). The bottom door 90 of the inverted drip pan 88 is in the open position. A remotely operated vehicle (ROV) (not shown) preferably guides the plurality of stabbing guides 18 of the pig launcher 12 to land on the plurality of guide posts 16 as shown in FIG. 2B. The ROV mates the mating connector portion 36b to the mechanical connector portion 36a and pressure tests the seal. The ROV opens the isolation valve 46 and the shut-off valve 34 between the pig launcher 12 and the pipeline 28, 32 to equalize the pressure in the pressure accumulator 56 and the purge accumulator 76 with the pressure in the pipeline 28, 32 as indicated by the internal pistons 62 and 82 shown in FIG. 2D. It is to be understood that the nitrogen charge pressure in the pressure accumulator 56 and the purge accumulator 76 is less than the pipeline pressure to allow the pipeline pressure to charge the accumulators 56 and 76. The subsea pig launcher assembly 10 is now installed and operational.

Figure 3A:
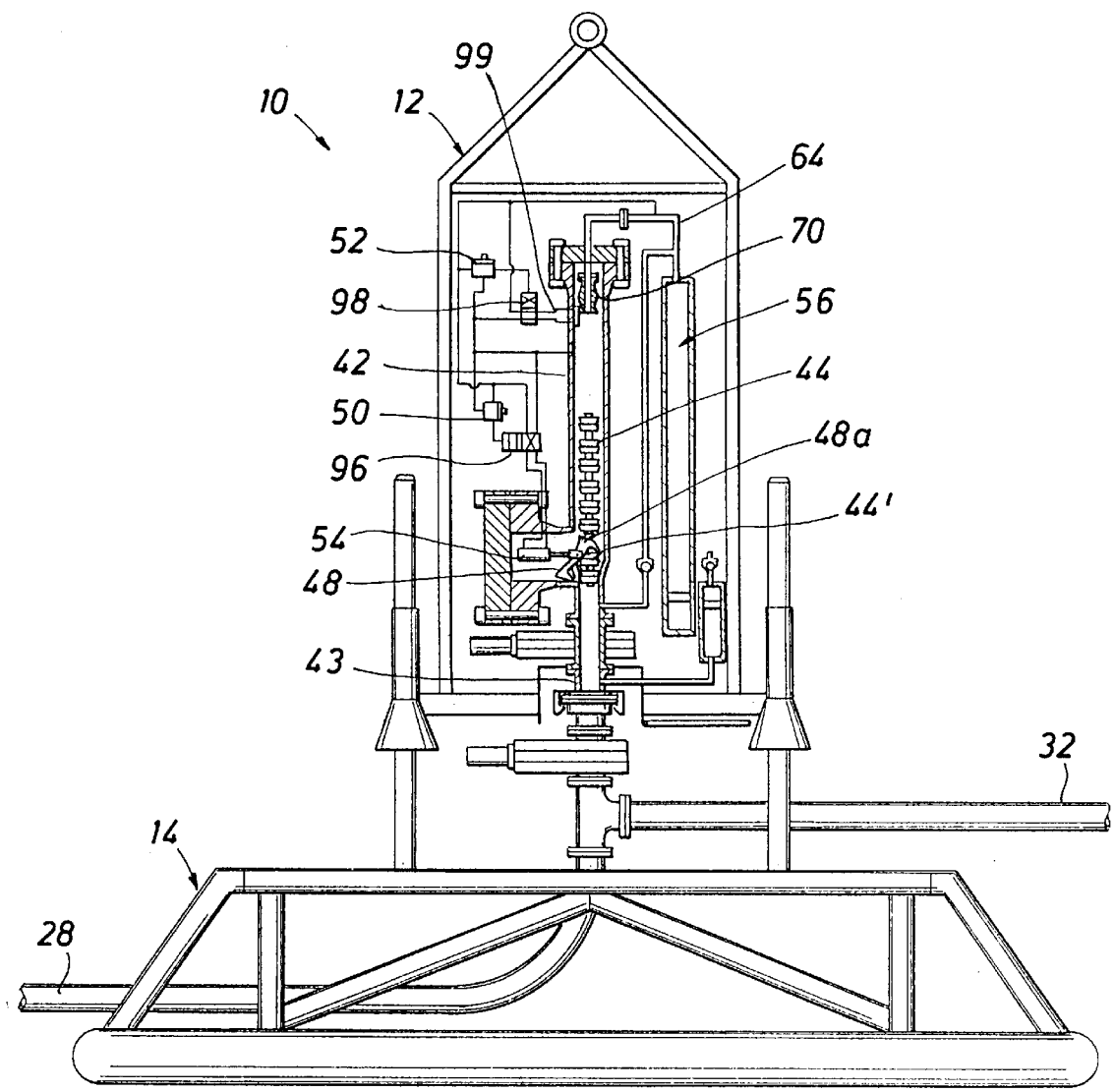
FIGS. 3A–3C are sectional elevational views showing the pig launching sequence of the subsea pig launcher.

The pig launching sequence will now be described in detail with specific reference to FIGS. 3A–3C. The pipeline operator initiates the pig launching sequence by reducing the product flow by controlling a wellhead valve (not shown) to reduce the pressure in the pipeline 28, 32, to the setpoint of the first sequence valve 50. Although not required, it may be desirable to set the pig launcher 12 to require one or more cycles down to a threshold pressure within a certain time limit to initiate the pig launching sequence. The pressure drop in the pipeline 28, 32 is sensed by the first sequence valve 50 which triggers the control valve 96. The control valve 96 operates the hydraulic cylinder 54 to move the pig gate 48 from the ready position (FIG. 2D) to the launch position as shown in FIG. 3A. In the launch position the lower fork 48b of the pig gate 48 is pivoted backward allowing the release of the lowermost pig 44' from the pig chamber 42. The upper fork 48a pushes or forces the lowermost pig 44' into the reduced diameter launch tube 43. It is to be understood that the pigs 44 have a diameter substantially approximating the inside diameter of the launch tube 43 to form a seal within the launch tube 43.

Figure 3B:
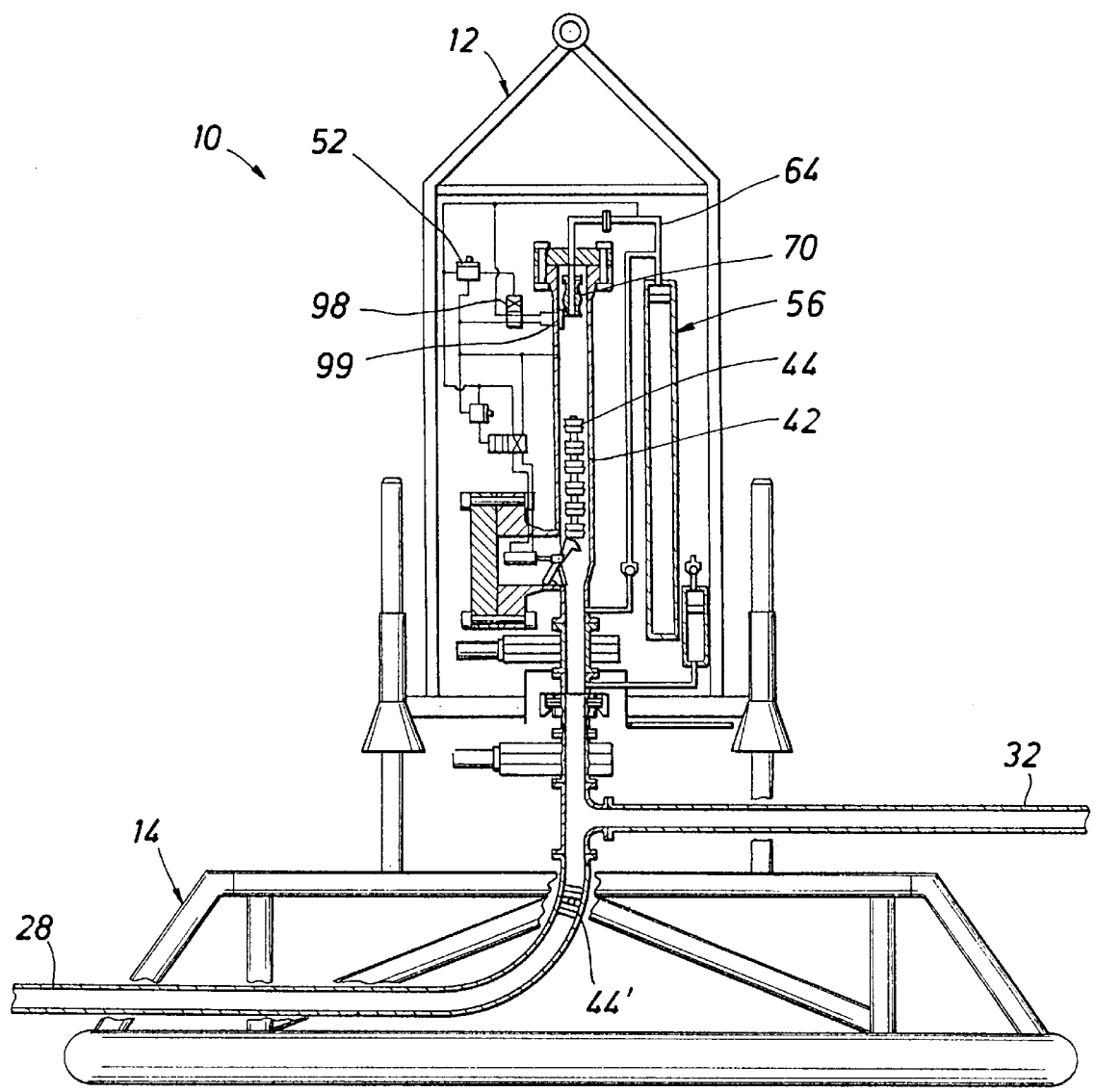

Referring to FIG. 3B, a further drop in pipeline pressure is sensed by the second sequence valve 52 which triggers the control valve 98. The control valve 98 operates the valve operator 99 to open the valve 70 connected to the first pipe spool 64 in the top of the pig chamber 42. As the valve 70 opens, the pressure in the pressure accumulator 56 (which is pressured at approximately the pipeline pressure prior to closing the wellhead valve) is released into the pig chamber 42. This pressure acts against the lowermost pig 44' and forces the lowermost pig 44' through the launch tube 43 and into the pipeline 28 as shown in FIG. 3B.

It is important to understand that since the pig 44' forms a seal within the launch tube 43, the pressure from the pressure accumulator 56 is not allowed to bypass the lowermost pig 44' but instead forces it into the pipeline 28. It is also to be understood that the diameter of the pipeline 28 is also preferably the same diameter as the launch tube 43. It is also important to understand that since the diameter of the pig chamber 42 is greater than the diameter of the launch tube 43 and pigs 44, the pressure from the pressure accumulator 56 can bypass the pigs 44 to apply pressure to the lowermost pig 44' in the launch tube 43.

Figure 3C:
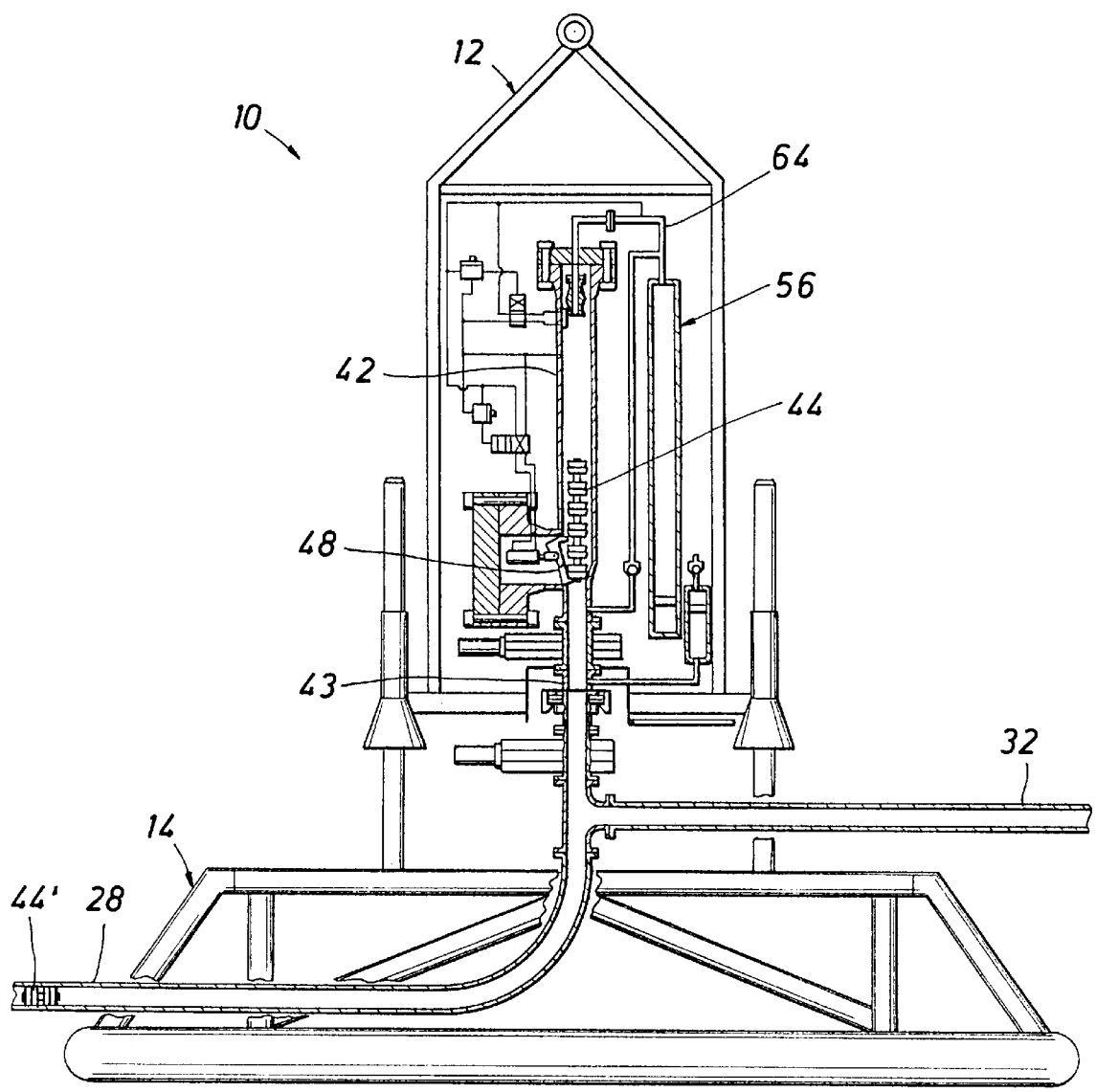

Referring to FIG. 3C, the wellhead valve is opened to increase the pipeline pressure to wellhead pressure. The pressure in the first pipe spool 64 rises to the level of the pipeline and wellhead pressure. The rise in pipeline pressure to wellhead pressure drives the launched pig 44' through the pipeline 28 and recharges the pressure accumulator 56. The rise in pressure in the first pipe spool 64 also cycles the pig gate 48 to the ready position to allow all the remaining pigs 44 to drop down by one pig length. The pig launcher 12 is again ready to launch the next pig 44 in the pig gate 48 in response to the cycling down of the pipeline pressure. The pig launching sequence is repeated until the last pig 44 has been launched from the subsea pig launcher assembly 10.

It is to be understood that an important feature of the present invention is that the controls and actuators (sequence valves 50 and 52, control valves 96 and 98, hydraulic cylinder 54, and valve operator 99) are powered by energy stored in the pressure accumulator 56, and that this energy storage is renewed each time the pig launcher 12 is exposed to wellhead pressure. This eliminates the need to supply power to the pig launcher 12.

Figure 4A:
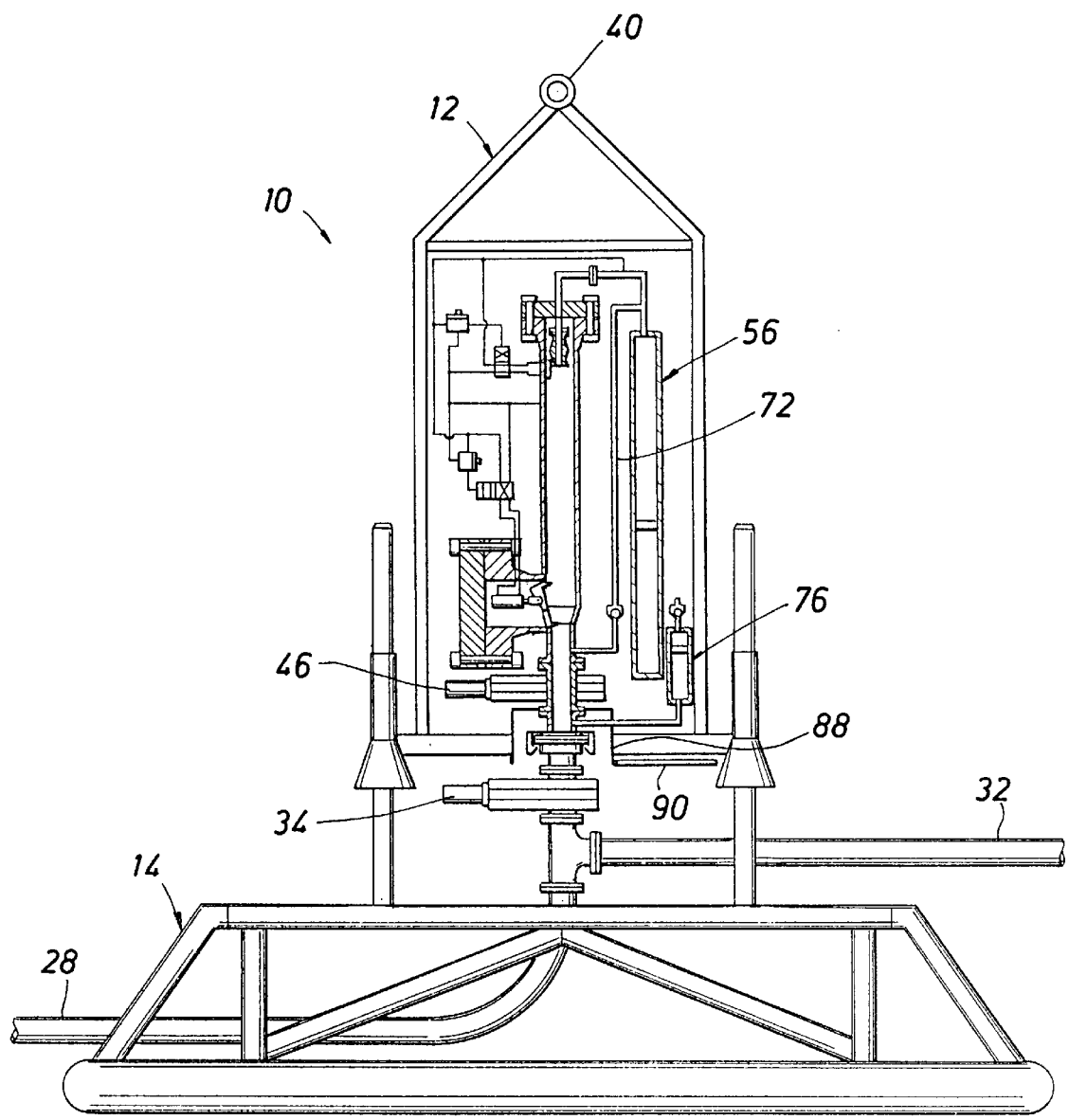
FIGS. 4A and 4B are sectional elevational views showing the recovery sequence of the subsea pig launcher to the surface.
Figure 4B:
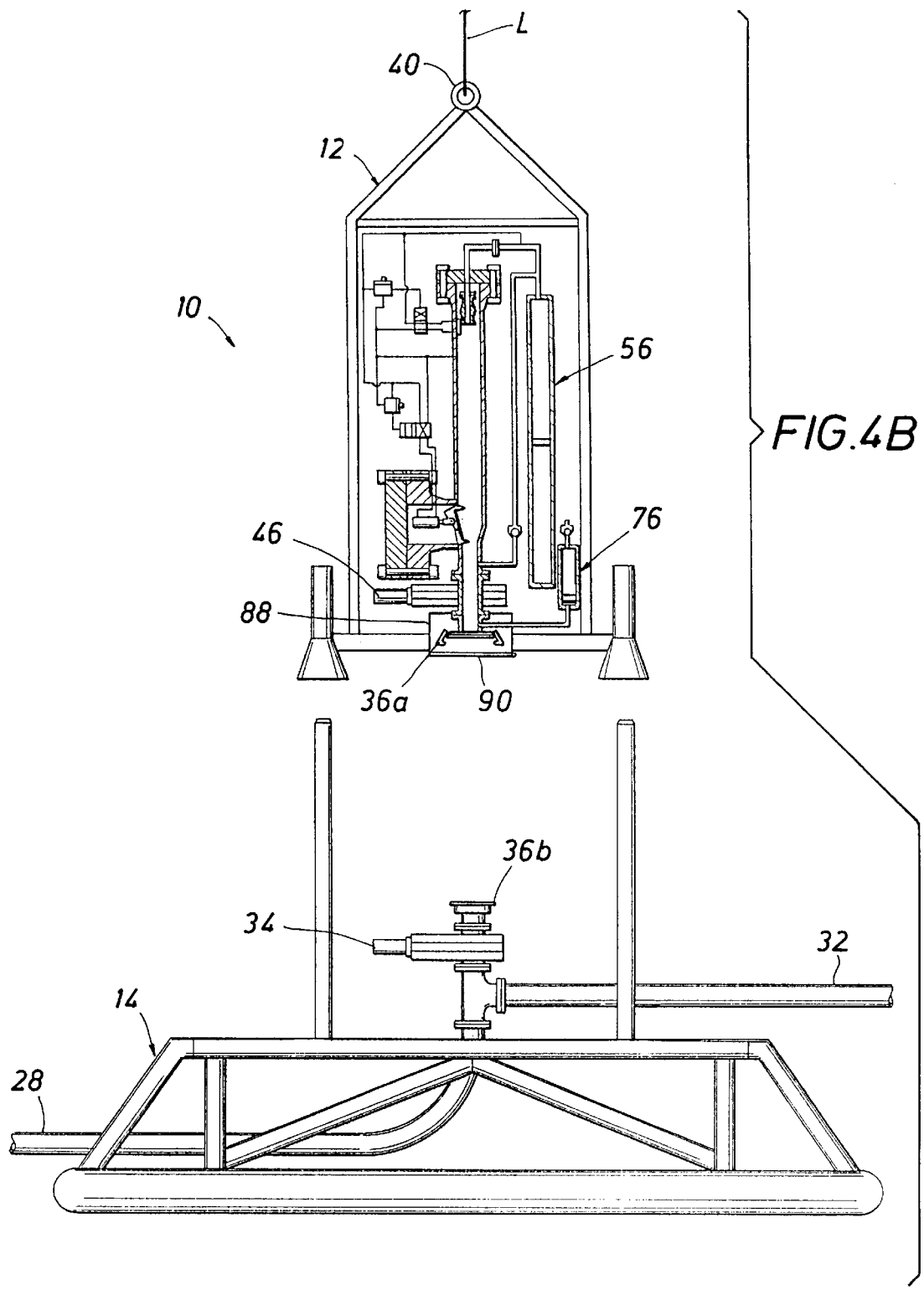

After all the pigs 44 have been launched from the subsea pig launcher assembly 10, the pig launcher 12 is recovered to a surface vessel (not shown) with the aid of an ROV (not shown). The ROV attaches the lift line L from the surface vessel to the lifting eye 40. Referring to FIGS. 4A and 4B, the isolation valve 46 and the pipeline shut-off valve 34 are closed by the ROV to isolate the pig launcher 12 from the pipeline 28, 32. The gas in the pressure accumulator 56 is isolated by closing the isolation valve 46 since the second pipe spool 72 is connected to the launch tube 43 above the isolation valve 46. Isolation of the gas in the pressure accumulator 56 prevents expansion or compression upon release from the pipeline 28, 32. The mechanical or collet connector 36 is released by the ROV and the surface vessel lifts the pig launcher 12 off of the pipeline base 14. The stored pressure in the purge accumulator 76 breaks the vacuum as the collet connector 36 separates. The nitrogen charge in the purge accumulator 76 provides the force to push the fluid out of the purge accumulator 76 and overcome any vacuum lock that may exist in separating the collet connector 36. The pig launcher 12 is lifted to the surface vessel as shown in FIG. 4B. The pig launcher 12 is recovered to the vessel deck with pipeline product at near seawater bottom pressure. The pipeline product can then be safely transferred to a suitable disposal location.

It is to be understood that when the collet connector 36 is separated, the oil or production fluid trapped between the isolation valve 46 and the shut-off valve 34 will attempt to rise to the water surface since it is lighter than water. The production fluid will rise into the inverted drip pan 88 and be trapped therein. The bottom door 90 is closed by the ROV to contain the production fluid within the drip pan 88.

At the surface, the pig chamber 42 is reloaded with pigs 44. Any trapped fluid in the pig launcher 12 is removed and the accumulators 56 and 76 are charged with pressurized gas, if needed. After functionally testing the pig launcher 12, the pig launcher 12 is made ready to re-deploy.

The subsea pig launcher assembly 10 is designed and configured to be deployed from a relatively low cost ROV support vessel to minimize the overall costs associated with maintaining and cleaning the subsea pipelines 28. The pig launcher 42 is capable of storing a plurality of individual pigs 44 and launching the pigs 44 individually into the pipeline 28. Thus, the frequency with which a support vessel is required to replenish the pigs 44 is reduced.

Another advantage of the subsea pig launcher assembly 10 is that it does not require a separate power umbilical. Instead, the pig launcher 12 stores wellhead pressure from the pipeline in the pressure accumulator 56 and then uses the pressure in the pressure accumulator 56 to launch each pig 44. The pig launcher 12 also uses the pipeline operating pressure to recharge the pressure accumulator 56 after each pig launch. Still another advantage of the subsea pig launcher assembly 10 is that the pig launcher 12 is controlled without a special umbilical control line from the host platform. A pressure sensing hydraulic logic circuit as described above eliminates the need for a dedicated control umbilical by sensing a pressure drop or a coded sequence of pressure changes in the pipeline 28. These pressure changes can be initiated through an existing control umbilical from the host platform to the subsea tree.

It is to be understood that the valve 70 has been positioned inside the pig chamber 42 to minimize the number of pressure holding seals to the external environment. Thus, any leakage of the valve stem of the valve 70 would occur within the pig chamber 42 and would not escape to the external environment. It is to be further understood that the design of the subsea pig launcher assembly 10 limits the pipeline pressure boundary penetrations to the shafts of the valve stems of the shut-off valve 34 and the isolation valve 46 and the collet connector 36. This also minimizes the risk of polluting the external environment.

FIGS. 5A–5E illustrate a method to modify an existing inverted U-jumper J connecting a subsea wellhead tree T to a pipeline P so that the pig launcher 12 of the present invention may be remotely installed on the pipeline P. This technique can be used with other types of jumpers as well.

Figure 5A:
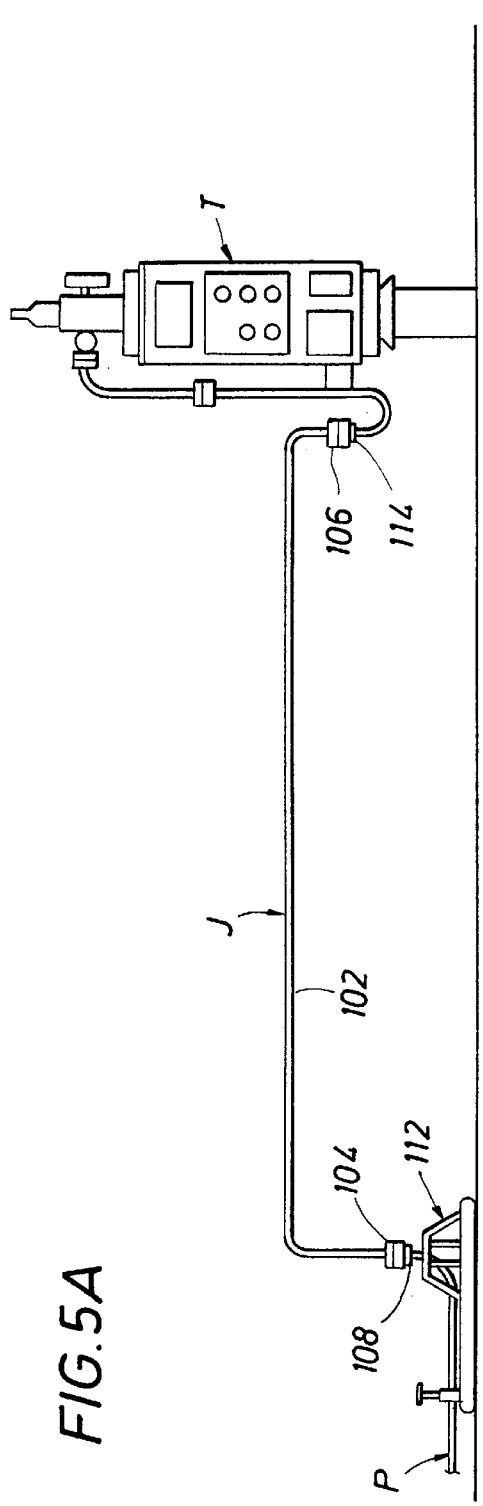
FIGS. 5A–5E are sectional elevational views showing the sequence steps to install the subsea pig launcher on a typical existing subsea pipeline having a U-jumper connection to a subsea wellhead.
Figure 5B:
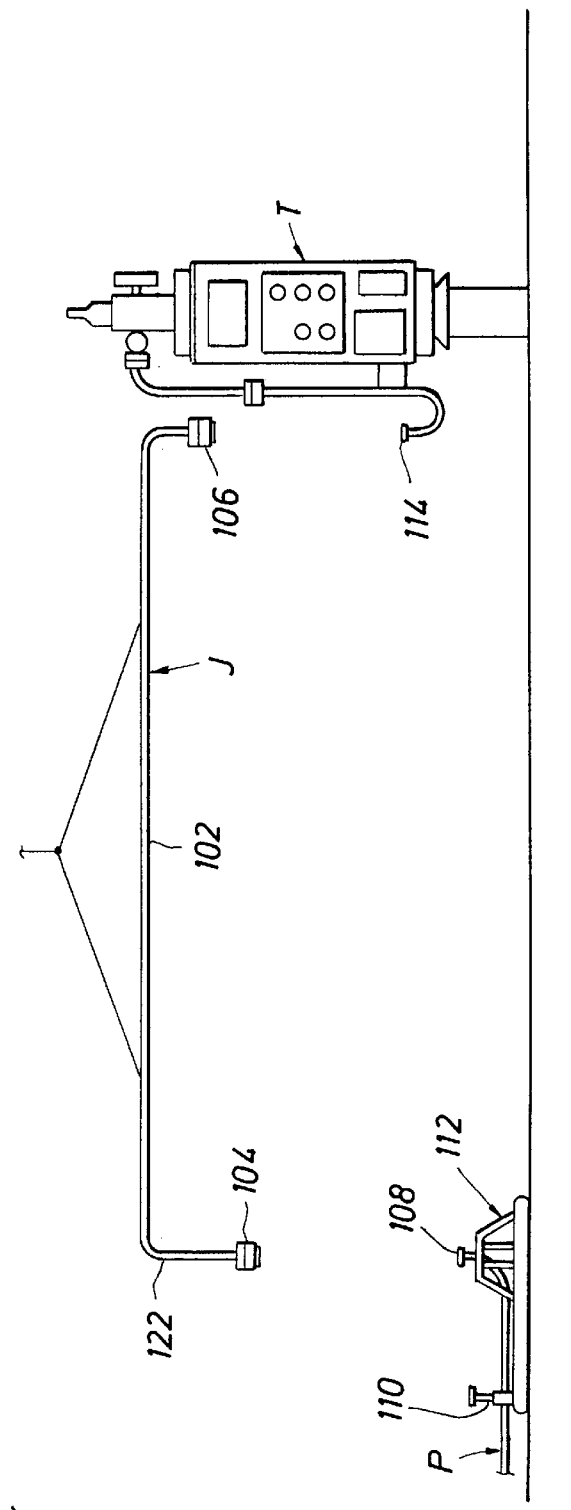

Referring to FIGS. 5A and 5B, the U-jumper J has a short length of pipe 102 having a downward facing connector hub 104 and 106 at the ends of the short length of pipe 102. The pipeline P has an upward facing connector hub 108. The pipeline P includes a pipeline valve 110 and a pipe end mud mat 112 for supporting the pipeline end hub 108. The subsea wellhead tree T includes an upward facing connector hub 114. The downward facing connector hubs 104 and 106 connect to the upward facing connector hubs 108 and 114, respectively, as shown in FIG. 5A.

Figure 5C:
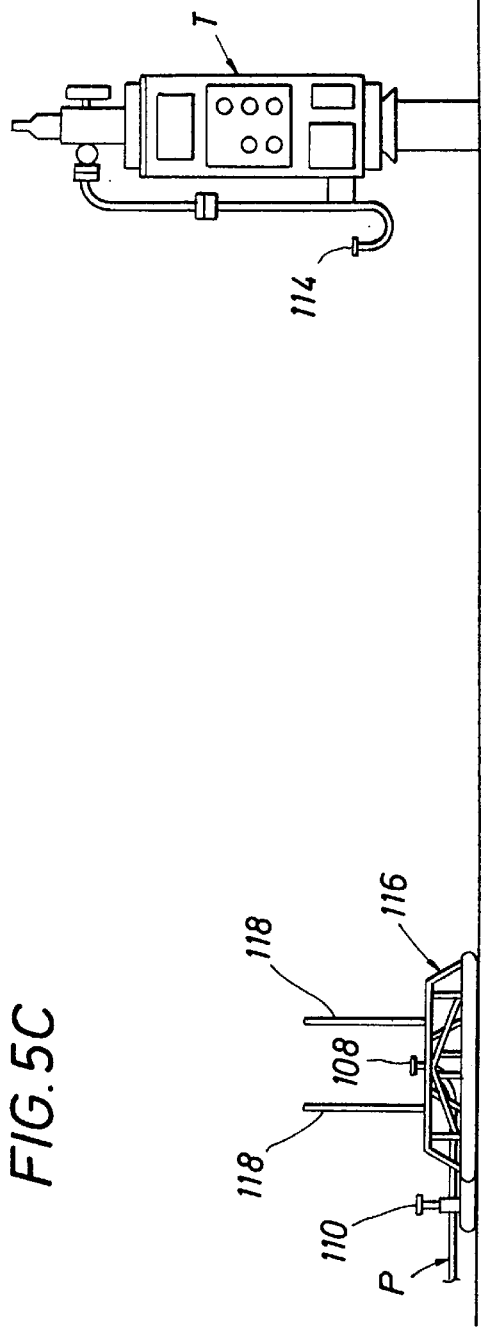
Figure 5D:
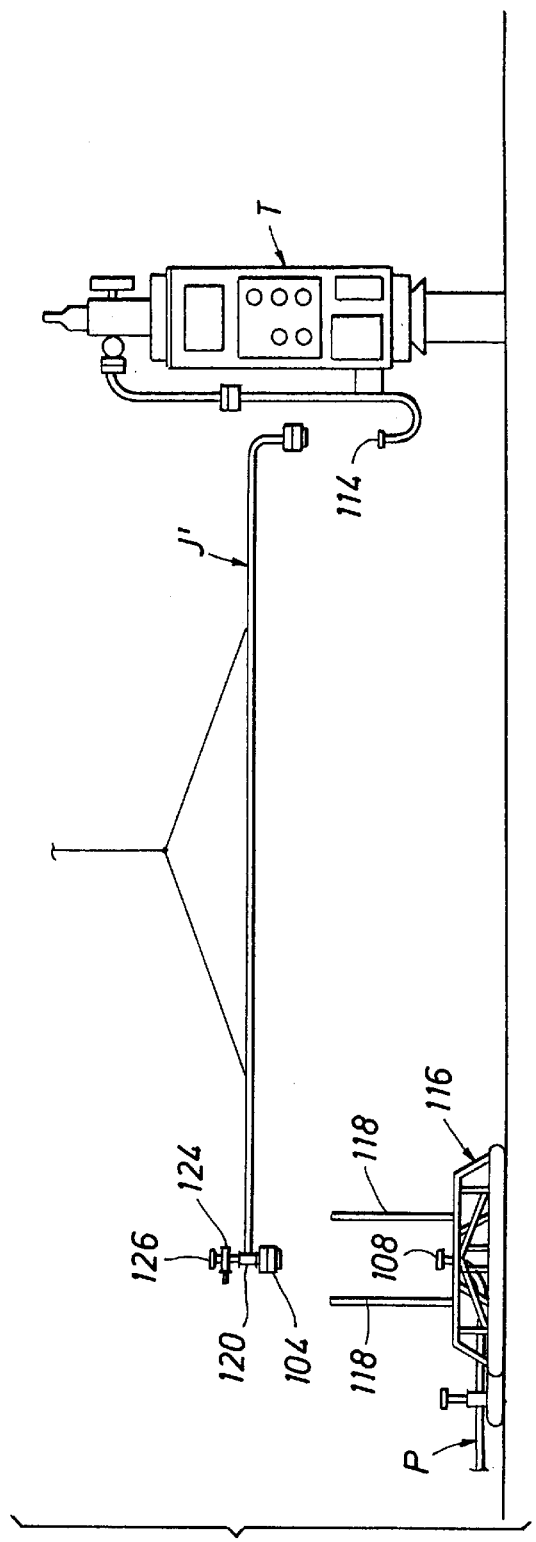

The U-jumper J is recovered to the surface using common remotely controlled techniques as shown in FIG. 5B. A pig launcher guide base 116 is specifically designed to rest on the sea floor and provide indexing with respect to the pipeline end hub 108. The pig launcher guide base 116, having a plurality of guide posts 118, is deployed from the surface and installed around the centerline of the upward facing pipeline connector hub 108 as shown in FIG. 5C.

Figure 5E:
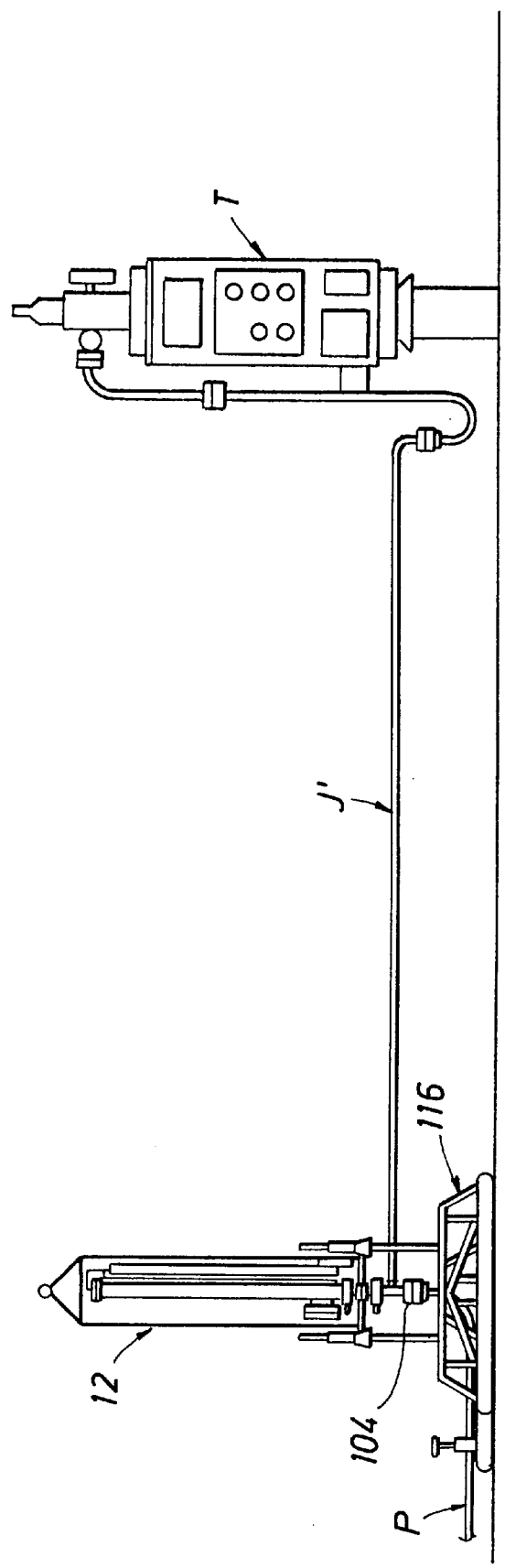

On the surface, the pipeline end of the U-jumper J is modified to install a piggable tee 120 (FIG. 5D) in place of the existing 90 degree elbow 122 (FIG. 5B). The tee 120 is then fitted with a shut-off valve 124 and an upward facing connector hub 126. The modified U-jumper J' is next deployed from the surface and reconnected to the subsea wellhead tree T and the pipeline P. The pig launcher 12 can now be deployed from the surface, aligned by the guide base 116, and connected to the upward facing connector hub 126 of the modified U-jumper J' as shown in FIG. 5E. The operation of the pig launcher 12 is the same as described above.

The foregoing disclosure and description of the invention are illustrative and explanatory thereof, and various changes in the details of the illustrated apparatus and construction and method of operation may be made without departing from the spirit of the invention.

We claim:

1. A method for launching an individual pig in a pipeline from a pig launcher having a pig chamber, a plurality of pigs, a launch tube, and a pressure accumulator, the method comprising the steps of:

pressurizing the pressure accumulator;

sensing a pipeline pressure within the pipeline at the pig launcher prior to launching a pig;

initiating a control sequence for launching the pig upon sensing a predetermined pipeline pressure setpoint; and applying pressure from the pressure accumulator to force the pig through the launch tube and into the pipeline.

2. The method of claim 1, wherein the pressure accumulator is initially pressurized to the pipeline pressure.

3. The method of claim 1, wherein the pressure accumulator is initially pressurized by the pipeline pressure.

4. The method of claim 1, further comprising the step of advancing a pig from the pig chamber into the launch tube.

5. The method of claim 4, wherein the step of advancing a pig is initiated by lowering the pipeline pressure.

6. The method of claim 1, wherein the step of applying pressure to force the pig through the launch tube is activated by the pipeline pressure.

7. A method for launching a pig in a pipeline from a subsea pig launcher having a pig chamber, a plurality of pigs, a launch tube, and a pressure accumulator, the method comprising the steps of:

charging the pressure accumulator with a wellhead pressure from the pipeline;

sensing the wellhead pressure at the pig launcher prior to launching a pig; and altering the wellhead pressure to launch a pig into the pipeline.

8. The method of claim 7, further comprising the step of releasing pressure from the pressure accumulator to forcibly launch the pig into the pipeline.

9. The method of claim 8, further comprising the step of recharging the pressure accumulator by controllably adjusting the wellhead pressure.

10. The method of claim 8, wherein the pig launcher is powered and controlled by pipeline pressure.

11. The method of claim 10, wherein the launching of the pig into the pipeline is controlled by the pipeline pressure.

12. A method for installing a subsea pig launcher to a pipeline connected to a subsea well head with a pipeline jumper, the method comprising the steps of:

provinding a pipeline jumper adapted to connect the pipeline to the subsea well head and also providing the pipeline jumper with a tee adapted to connect to the subsea pig launcher;

connecting the pipeline jumper between the pipeline and the subsea well head; and connecting the subsea pig launcher to the pipeline jumper tee.

13. The method of claim 12, further comprising the step of launching a pig from the subsea pig launcher into the pipeline jumper.

14. A method for pigging a pipeline connected to a subsea well head with a pipeline jumper, the method comprising the steps of:

providing a pipeline jumper adapted to connect the pipeline to the subsea well head and also providing the pipeline jumper with a tee adapted to connect to a subsea pig launcher;

connecting the pipeline jumper between the pipeline and the subsea well head;

connecting the subsea pig launcher to the pipeline jumper tee;

altering a first pressure in the subsea well head to launch a pig from the subsea pig launcher into the pipeline jumper; and forcing the pig through the pipeline with a second pressure in the pipeline.

15. The method of claim 14, further comprising the step of recharging a pressure accumulator of the subsea pig launcher by controllably adjusting the first pressure.

16. The method of claim 14, wherein the subsea pig launcher is powered and controlled by changing pressure in the pipeline.

* * * * *